Aug. 15, 1967  C. E. ANDERSON  3,335,740
VALVE
Filed Aug. 10, 1964
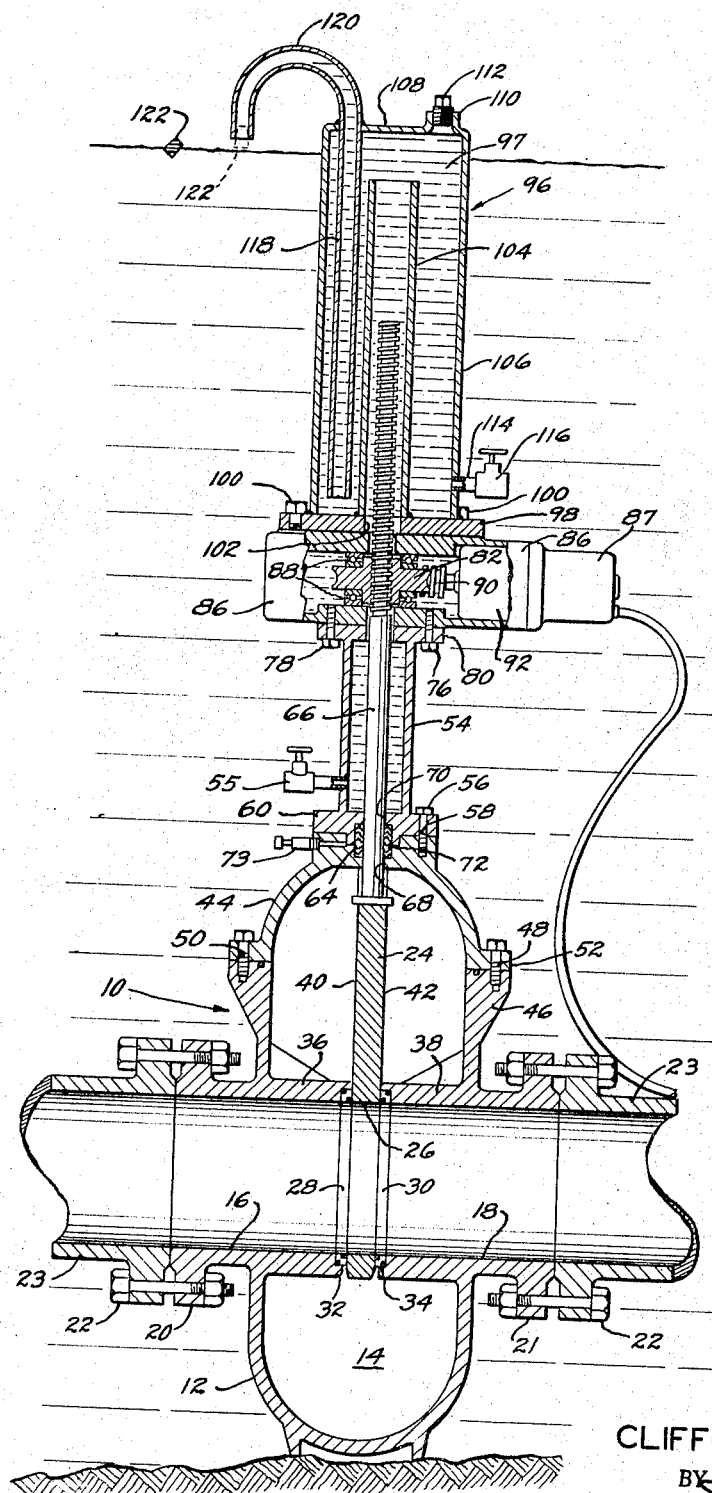
INVENTOR.
CLIFFORD E. ANDERSON
BY
AGENT

United States Patent Office 3,335,740
Patented Aug. 15, 1967

3,335,740
VALVE
Clifford E. Anderson, Houston, Tex., assignor to ACF Industries, Incorporated, New York, N.Y., a corporation of New Jersey
Filed Aug. 10, 1964, Ser. No. 388,648
6 Claims. (Cl. 137—236)

This invention relates generally to valves and more specifically to valves and remote operating systems therefor which are adapted for intermittent submersion in fluids such as sea water, for example.

The petroleum industry in its continuous exploration and research programs has recently discovered and developed a number of offshore petroleum reserves of major importance and it is expected that such activity will be greatly increased. Heretofore completion of offshore oil wells, which includes the installation of a wellhead assembly which supports the string or strings of tubing in the well and connecting the wellhead assembly to production equipment, has been accomplished on a platform positioned above the surface of the ocean. Recent developments in completion techniques have resulted in underwater oil well completion, where the wellhead assembly is positioned on or adjacent the ocean floor. Since each wellhead assembly contains a number of valves, underwater completion of oil wells presents a number of problems to the valve industry. Valves must be provided which will withstand the corrosive effects of sea water and which can be operated remotely through the use of power operators to selectively open or close the valve. Since submerged valves may be positioned under several hundred feet of water and may be subjected to severe hydrostatic pressures developed by the water, valves and valve control systems must be provided which will withstand the destructive effects of hydrostatic pressures and which will control the corrosive action of sea water.

Due to the development of modern super tanker vessels to transport crude oil for the petroleum industry, a number of offshore facilities have been developed about the world to facilitate loading and unloading of these vessels. Modern super tanker vessels may have a draft approaching 75 feet which prevents their use in many ports throughout the world. Occasionally these super tanker vessels are partially loaded in a port facility and then are moved into water of sufficient depth where the loading operation is finished by transferring fluid from a smaller tanker vessel to the large vessel. Generally offshore loading facilities are preferable to control the loading and unloading of these vessels.

A number of offshore loading facilities have been developed which utilize submerged pipelines and which have submerged remotely controlled valves at the end of the pipeline for controlling the flow of fluid through the systems. Large flexible hoses, which are connected to the end of the pipelines or to the discharge side of the submerged valves, lie on the ocean floor when not in use, and have marking buoys attached to the free end thereof by a small cable or line. The vessel to be loaded or unloaded, after anchoring near the marking buoy, retrieves the marking buoy and hoists in the line or cable which in turn raises the flexible hose from the ocean floor. After the hose has been cleaned by washing off any mud accumulation or marine growth, etc., connection is made to the vessel. A control station located on shore and which might be up to two miles from the valve to be controlled, is provided with power control apparatus for operating a fluid motor, generally called a piston operator, which is mounted on the valve and which moves the gate or valve element of the valve to an open or closed position as desired. After receiving some signal, as a radio signal, visual signal, or audible signal from the vessel that the connection has been made, the control station starts its fluid pumping equipment and remotely controls opening and closing of the offshore submerged valves as desired. Such remotely controlled operating devices for valve control may be operated by hydraulic, gas, or electric systems. Any of many well-known suitable types of valve operators might be employed without departing from the spirit or scope of this invention.

One disadvantage of most remotely controlled valve operator systems is their inability to indefinitely withstand the destructive effects of severe hydrostatic pressure on the ocean floor. One development involves the encasement of the entire valve and operator system in a casing constructed sufficiently strong to stand the hydrostatic pressure to which the valve system is to be subjected. However, even under relatively shallow water depths, such as 50 to 100 feet, for example, a very large casing for encasing a large valve and operator system must be fabricated of extremely heavy metal, thereby making the system quite expensive. Such a casing must also be constructed sufficiently strong to withstand external fluctuating pressures, such as are caused by changing tide levels in the ocean and internal casing pressure fluctuations which are caused by movement of the valve stem of the valve. As the valve stem is moved in a direction outwardly of the valve, it displaces a portion of the air in the container thereby causing a considerable pressure increase within the container. Another difficulty inherent in valve systems which are enclosed in casings, is that leakage from the valve through the stem packing cannot be permitted. Fluid leaked from the valve will fill the casing and cause excessive internal casing pressure which will rupture the casing and allow sea water to damage the valve and operator system. Leakage of fluid from the valve will fill the casing and cause damage to the operator assembly even if rupture of the casing does not occur. Another serious disadvantage in the use of an encased operator system is that a pressure increase in the casing which might be caused by leakage of fluid from the valve, may cause pressure locking of the valve. The valve cannot be opened or closed in a pressure locked condition. Pressure locking occurs when the casing becomes filled with an incompressible fluid. The incompressible fluid within the casing will prevent movement of the stem into the casing and, therefore, will prevent operation of the valve. Unless the casing is constructed extremely strong the severe internal casing pressures, developed by the power operator as it attempts to force the valve stem into the filled casing, will cause the casing to rupture. Casing enclosed valves and remote operator systems are also impractical from a servicing consideration. The valve and operator system for a submerged valve are completely enclosed by the casing, thereby even the simplest of servicing, such as adjustment of the valve packing to stop packing leakage, is rendered impossible.

Another development has been the provision of a casing about the entire valve and operator system, such as described above, and to fill the casing with transformer oil. The casing is then connected to an accumulator which is precharged with nitrogen to a pressure in excess of the final hydrostatic pressure to which the valve is to be subjected. When the encased pressurized valve and operator system is positioned on the ocean floor, the internal pressure of the casing will be slightly above the hydrostatic pressure. The valve stem in moving outwardly of the valve will merely displace the oil in the casing which will in turn further compress the nitrogen gas in the accumulator. Pressure within the casing will fluctuate as the valve stem is reciprocated but it will be at a level slightly above hydrostatic pressure at all times. Since the internal and external pressures of the casing will differ only slightly when the valve and operator system is submerged, the casing may be constructed from light material, thereby reducing the cost and bulk of the system as compared to the unpressurized casing system. A system of this type is also subject to criticism because minor servicing, such as stem packing adjustment, which may be accomplished by a diver, is rendered impossible because the valve and operator system is surrounded by the casing. An enclosed system of this type is also subject to damage by leakage of the valve which will increase the internal pressure of the casing to a high enough level to cause the casing to rupture. This system also may be subject to failure induced by pressure variations caused by rising and falling of the tide and by movement of the valve stem within the casing as discussed above. Another criticism is that leakage of the pressurizing system of the casing will result in a loss of pressure within the casing allowing hydrostatic pressure to collapse or rupture the casing. If the casing develops a minor leakage, sea water will enter the system and will cause corrosion or other damage to the operator and the valve necessitating the replacement thereof.

A further consideration in the development of submergible valves and valve operator systems involves the installation of a power operated valve in a location where at least a portion of the system, if not all of the system, is subjected to intermittent submersion in a fluid such as sea water, which for example might occur as a result of tidal fluctuations.

While exterior corrosion of the valve and its operator systems can be effectively prevented by employing special protective coatings and/or employing corrosion resistant materials, the interior working parts of the operator systems cannot be so protected.

Accordingly, it is a primary object of this invention to provide a novel pressure balancing system for the power operator of a valve which causes the pressure within the power operator to be balanced with hydrostatic pressure at all times.

It is a further object of this invention to provide a novel pressure control system for a valve operator, which will permit leakage of lading from the valve into the pressure system without causing damage to either the valve or the system.

It is a further object of this invention to provide a novel pressure control system for a remotely controlled valve wherein minor servicing, such as adjustment of the stem packing to stop packing leakage may be accomplished underwater.

It is among the objects of this invention to provide a novel environmental pressure control system for a valve and valve operator system which is adapted for intermittent submersion in a liquid medium.

An even further object of this invention contemplates the utilization of the hydrostatic pressure of the medium surrounding the valve and valve operator for pressurizing the internal portion of the operator.

It is an even further object of this invention to provide a novel pressure control system for a submergible valve and valve operator system, which is inexpensive in manufacture and reliable in operation.

Other and further objects of this invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for the purpose of illustration and description and is shown in the accompanying drawing forming a part of the specification.

The single figure of the drawing is a sectional view in elevation, illustrating a gate valve provided with a power operator and a pressure balancing structure in accordance with this invention.

Briefly, the invention consists of a remotely controlled valve stem drive system for a rising stem type valve and which includes structure to maintain the internal pressure within the drive system in a balanced condition with the hydrostatic pressure of the medium surrounding the drive system. Structure is provided which will communicate hydrostatic pressure of sea water to the interior of the pressure controlled unit and yet maintain the interior of the pressure controlled unit against the corrosive effects of the sea water. Structure is also provided which will allow the system to be employed in locations where it might be subjected to intermittent submersion.

Referring now to the drawing for a better understanding of the invention, a valve 10 is illustrated, which comprises a valve body 12 formed with a valve chamber 14 and having flow passages 16 and 18 in communication with the valve chamber 14. Flanges 20 and 21 are formed integral with the valve body and receive bolts 22 for bolting the valve into a flanged pipeline 23. The valve may be connected to a pipe system by any other well-known connection structure, such as welded or threaded connection for example, without departing from the spirit or scope of this invention.

A gate member 24 having a port 26 formed therein is positioned within the valve chamber 14 and is movable between an open position, where the port 26 is aligned with the flow passages 16 and 18 to permit the flow of fluid through the valve, and a closed position blocking the flow of fluid through the valve. A pair of identical seat assemblies 28 and 30 are positioned in opposed seat recesses 32 and 34 formed respectively in annular bosses 36 and 38, which extend into the valve chamber 14. The gate 24 is provided with parallel planar working surfaces 40 and 42 which are engaged by the seat assemblies 28 and 30 respectively to establish a fluid-tight seal between the gate and the valve body. A bonnet assembly 44 is removably fixed to an annular flange portion 46 of the valve body 12 by a series of threaded studs 48 which extend through a series of openings 50 formed in an annular bonnet flange 52 to form a sealed closure for the valve chamber 14. A yoke tube assembly 54, having a filling fitting 55 threaded or welded thereinto, is fixed to the bonnet 44 by a series of threaded studs 56 which extend through openings 58 formed in an annular flange 60 of the yoke tube 54 and are threaded into an annular series of threaded openings 62 in the bonnet 44. A packing chamber 64 is formed by enlarged concentric bores formed in the bonnet and in the yoke tube 54.

A valve stem 66 is fixed to the gate 24 and extends through openings 68 and 70 formed respectively in the bonnet and yoke tube and through the packing chamber 64. A packing assembly 72 is positioned within the packing chamber 64 and surrounds the valve stem 66 to provide an effective seal between the bonnet and the valve stem. A power operator 74 including a drive unit 86 powered by a motor 87 is fixed to the upper portion of the yoke tube 54 by a series of bolts 76 which extend through a series of openings 78 formed in an annular flange 80 of the yoke tube. The motor 87 may be one of various well-known types, for example electrically energized or fluid energized, without departing from the spirit and scope of this invention. The motor 87 will generally be controlled remotely from a distant power source. An internally threaded drive gear 82 which mates with exterior threads 84 formed on the valve stem 66 is supported for rotation within the drive unit 86 by upper and lower thrust bearings 88. A worm gear 90 is actuated through a series of reduction gears 92 by the motor 87 to impart rotation to the drive gear 82. The motor 87 upon being energized will, through its gear reduction system, impart rotary motion to the drive gear 82 which causes the interengaging threads between the drive gear and the valve stem to impart axial movement to the valve stem and thereby induce opening or closing movement to the gate 24. The specific stem drive unit described above is intended to be merely illustrative and any of the numerous kell-known suitable stem drive systems which are commercially available might be utilized in accordance with this invention without departing from the spirit or the scope thereof.

In accordance with a feature of this invention, a pressure balancing unit 96 is provided for the purpose of maintaining a balanced condition between the internal and external pressures associated with the drive unit and yoke tube assembly of the valve. The pressure balancing unit 96 comprises a base plate 98, which is fixed in sealed relation to the upper surface of the power operator 86 by a series of bolts 100. A gasket may be placed between the power operator and the base plate if desired. The base plate 98 is formed with a central aperture 102 aligned with the stem 66 and through which the valve stem is allowed to reciprocate. An elongated internal tubular member 104, being open at its upper extremity, is fixed to the base plate 98 about the central aperture 102 by welding or the like and extends well beyond the uppermost position of the free end of the valve stem. A generally elongated tubular housing 106 is disposed about the internal tubular member 104 and is fixed to the base plate 98 by welding or the like, the housing defines a chamber 97 of substantial volume. The housing 106 extends beyond the upper extremity of the internal tubular member 104 and is provided with a closed end wall 108, which is disposed in spaced relation with the closed end wall of the internal tubular member. An internally threaded fitting 110 is fixed to the end wall 108 of the housing 106 and is formed with internal threads for receiving the external threads of a filling plug 112. Adjacent to the lower end of the housing 106 is a valve fitting 114 which extends from the wall of the housing 106 and which supports a valve 116 for filling or draining the chamber 97. An elongated overflow tube 118, having each end open, is fixed to the end wall 108 by welding or the like and extends through an opening in the end wall 108 of the housing 106 and between the tubular member 104 and the housing 106 to a position adjacent the base plate 98. An upper portion of the overflow tube 118 extends outwardly through the end wall 108 of the pressure balancing unit 96 and is provided with a return bend 120 of substantially 180°. The return bend portion 120 of the overflow tube 118 is provided with a plug member 122, which is press-fitted within the tube opening, as illustrated in dash lines in the figure. The plug 122 may be formed of various plastics, rubber material, or the like, and is adapted to be displaced or blown from the overflow tube outlet opening during the first actuation of the valve stem member from its lowermost position to its uppermost position as will be discussed hereinbelow.

Installation procedures for a submerged pipeline system generally require that the valve and pipeline components be preassembled on an installation vessel and then lowered to the ocean floor. During the installation of a valve employing a power operator and a pressure balancing system in accordance with this invention, the valve is preassembled into the pipeline, as discussed hereinabove, and the power operator and pressure balancing and volume controlling unit 96 is preassembled to the valve. The valve stem 66, during the installation procedure, will be in its unextended position. With the drain plug 112 and the press-fitted plug 122 removed from their respective openings, the pressure balancing unit, power operator and yoke tube are filled with a preservative oil of lubricating quality, such as transformer oil for example. Oil is utilized within the pressure balancing system not only for its preserving qualities, but also because it is a fluid of lower specific gravity than the water in which the unit will be submergible; and also because the oil will not mix with water. The oil will float on top of the water and will establish a liquid seal within the pressure balancing chamber 97. After the drain plug 112 and the plastic plug 122 have been replaced in their respective openings, the system will be ready for submersion. The valve and operator assembly are then lowered to the ocean floor along with the pipeline 23 and the system is ready for its initial operation. Since the valve stem 66 is positioned in its unextended position during the filling operation, a minimum amount of the volume of the chamber 97 is displaced thereby. As the valve stem is driven outwardly of the valve and into the chamber 97 during its first actuation, the fluid within the chamber 97, being incompressible, will rapidly cause an increase of pressure within the chamber. This pressure increase is the result of attempting to displace the fluid in the chamber with the valve stem. When the internal pressure of the chamber reaches a level substantially above the hydrostatic pressure of the sea water at the valve level, the plug 122 will be blown from the outlet of the overflow tube by the pressurized fluid, thereby allowing some of the fluid to flow out through the opening and allowing dissipation of the excessive pressure within the chamber 97. As the stem 66 continues to be moved toward its extended maximum position by the power operator, a volume of oil equal to the volume displaced by the portion of the valve stem entering the chamber 97 will be forced out through the overflow tube 118 and will be lost into the sea.

Assuming that the pressure balancing unit is filled with oil and that the unit is submerged in sea water, the oil which is forced into the sea will rise to the surface of the sea, thereby indicating a successful first actuation of the system. Immediately after the plug 122 has been blown from the overflow tube 118, the pressure within the chamber 97 will subside and will become balanced with the hydrostatic pressure of the sea water. After the plug 122 has been displaced, the internal and external pressures will be transmitted through the overflow tube 118 and thereby causing a balanced condition to be maintained at all times. Upon movement of the valve stem 66 to its lowermost position, a quantity of sea water equal to that portion of the valve stem which moves below the yoke tube, will be drawn into the overflow tube 118. Since water is of a higher specific gravity than oil, any water which passes over the highest point of the overflow tube bend 120 will flow downwardly through the overflow tube 118 and into the lowermost portion of the pressure balancing unit. After several actuations of the valve stem 66 between its uppermost and lowermost positions, a predetermined portion of the pressure balancing chamber 97 will become filled with sea water. The overflow tube 118 at this time also will be completely filled with sea water, thereby preventing any further displacement of transformer oil by the sea water. The internal tubular member 104, which surrounds the valve stem 66, serves as a barrier to prevent the sea water from entering the drive unit and the yoke tube of the power operator system. The sea water or other liquid medium, since it is of a higher specific gravity than the oil, will not be allowed to rise above a position immediately adjacent the lower extremity of the overflow tube 118.

If the valve packing assembly of the valve becomes worn to the extent that lading begins to leak from the valve chamber 14 past the valve packing assembly 72 and into the yoke tube 54, the internal pressure within the drive unit 86 and the pressure balancing chamber 97 would not be increased above hydrostatic pressure of the sea water as would occur in casing enclosed systems. The fluid leaking into the yoke tube 54 from the valve packing assembly 72 would merely displace the transformer oil within the system causing the oil to flow out of the overflow tube 118 of the pressure balancing unit. When this occurs the transformer oil being of lower specific gravity than water, will appear on the surface of the body of water in which the valve is submerged to indicate that service is needed. The leaked fluid, since it will generally be crude oil or another petroleum product, is also of lower specific gravity than the specific gravity of sea water and will rise to the surface of the body of water in which the system is submerged to indicate an occurrence of packing leakage. A diver then may be sent down and by using a simple wrench may adjust the packing fitting 73 to repressurize the valve stem packing and thereby stop the leakage. The diver may then connect a filling conduit to the yoke tube connection fitting 55 and from a pressurized fluid supply may force additional transformer oil into the yoke tube and the power operator unit to displace or flush the lading from the entire assembly. An outlet conduit may be connected to the fitting 110 so that the flushed fluid may be transported to the surface of the ocean without contaminating the ocean or losing the fluid.

Pressure locking of an encased valve and operator assembly, which may occur if the casing becomes filled with an incompressible liquid, is effectively eliminated by this invention. In a casing enclosed system, if the casing becomes filled with leaked lading, the stem will not be able to displace the liquid and, therefore, will cause a great pressure increase within the casing. If the casing does not burst from the build-up of pressure, the motor which drives the operator will stall, possibly destroying the motor or otherwise damaging the operator system. This occurrence is generally referred to as "pressure locking." Pressure locking of a valve and valve operator system employing the invention cannot occur because the chamber 97 is always open to the medium surrounding the valve through the overflow tube 118 to allow fluid, which is displaced by the stem as the stem is moved, to flow outwardly of the chamber 97. The pressure balancing unit 96 may be lightly and inexpensively constructed without regard to the depth at which the system is to be located because the internal and external pressures will always remain balanced and there will be no occurrence of pressure differential, which would damage the casing of the pressure balancing unit.

Assuming now that the upper portion of the pressure balancing unit 96 becomes exposed above the level of the ocean, as indicated in the drawing, the fluid within the return bend portion 120 of the overflow tube 118 will drain out and thereby will become displaced with air. Movement of the valve stem 66 under these conditions from its lowermost position to its uppermost position will cause an amount of fluid, equal to the volume of fluid displaced by the valve stem, to flow outwardly of the overflow tube 118 where it will become lost. As the stem is returned to its lowermost position, air will be drawn into the tube 118, but will not reach the lower extremity of the tube 118 because the volume of the tube interior is substantially greater than the volume of fluid displaced by the valve stem. Assuming that the upper portion of the pressure balancing unit 96 remains above the surface of the water, continued reciprocation of the valve stem 66 from its lowermost to its uppermost position will merely cause the liquid level within the overflow tube 118 to rise and fall causing ingress and egress of air in the tube 118. If the pressure balancing unit should become resubmerged, such as by the rising tide level of the ocean for example, reciprocation of the valve stem would merely force an amount of air from the overflow tube 118 in the same manner discussed hereinabove. Movement of the valve stem from its uppermost position to its lowermost position under this condition, will merely draw an amount of water into the overflow tube 118 and the air within the tube 118 will rise to the upper level of the bend portion 120 of the tube 118 where it will be displaced by the water on the next actuation of the valve stem. The novel pressure balancing unit 96, therefore, adapts the valve operator system for intermittent submersion without allowing any portion of the power operator to become contaminated due to excessive loss of the preservative fluid.

While discussion of this invention has generally been directed to the use of a pressure balancing system submerged in sea water, it should be obvious that the valve may be submerged in any liquid medium. The preservative liquid within the pressure balancing unit, however, must be of a lower specific gravity than the specific gravity of the surrounding medium and the two fluids must not have the tendency to mix.

It will be evident from the foregoing that I have provided a novel pressure balancing and volume control apparatus for the power operator of a rising stem valve, which effectively maintains a pressure balanced condition internally and externally of the power operator system at all times regardless of the internal volume fluctuation or external pressure variation. The pressure balancing and volume controlling apparatus of this invention effectively prevents damage to the power operator system by leakage of fluid from the valve and permits servicing of the system while the same is in operation. Since the invention negates the use of a casing for enclosing the entire system as well as a pressurizing system for the casing, and since the structure is extremely simple, the cost for producing would accordingly be quite low as compared to the cost of casing enclosed valve protection systems. The novel construction of the pressure balancing system of this invention effectively adapts the construction for use in locations which are subjected to intermittent submersion. Therefore, it is seen that this invention is one well adapted to attain all of the objects hereinabove set forth, together with other advantages which are obvious and inherent from the description of the apparatus itself.

It will be understood that certain features and subcombinations are of utility and may be employed without reference to other features and subcombinations.

This is contemplated by and is within the scope of the claims. As many possible embodiments may be made of the invention without departing from the spirit or the scope thereof, it is to be understood that all matters herein set forth or as shown in the accompanying drawing are to be interpreted as illustrative and not in a limiting sense.

I claim:

1. A valve system adapted for intermittent submersion in sea water, said valve comprising a valve body forming a valve chamber and having flow passages communicating with the valve chamber, a valve member having a port formed therein and being movable between open and closed positions relative to the flow passages, a stem connected to the valve member and having a free end thereof extending outwardly of the valve body, said stem being movable axially to impart movement to the valve member, power operated means surrounding a portion of said stem and being operative to impart axial movement to the stem and valve member, pressure balancing and volume controlling means enclosing the free end of the stem, said pressure balancing and volume controlling means including a housing defining a pressure balancing chamber, said chamber having an opening at the upper extremity thereof establishing fluid communication between said sea water and said chamber, said chamber being substantially filled with a liquid having a lower specific gravity than the specific gravity of sea water and which will not mix with sea water, said liquid defining a fluid seal with said sea water to prevent contamination of said power operated means, means for retaining said liquid within said chamber during alternate submersion and exposure of said housing relative to the surface of said sea water.

2. A valve system adapted for intermittent submersion in sea water and comprising a valve body forming a valve chamber and having flow passages communicating with the valve chamber, a valve member having a port formed therein and being movable between open and closed positions relative to the flow passages, a stem connected to the valve member and having a free end thereof extending outwardly of the valve body, said stem being movable axially to impart movement to the valve member, power operated means surrounding a portion of said stem and being operative to impart axial movement to the stem and valve member, a pressure balancing and volume controlling housing defining a chamber for surrounding the free end of the stem, said chamber having at least one opening at the upper extremity thereof for allowing the flow of sea water alternately into and out of the chamber during operation of the power operated means, means for establishing a fluid seal within the chamber for preventing the sea water from coming into contact with the internal portion of the power operated means, and maintaining interior and exterior pressures of the power operated means in a balanced condition, means preventing contamination of the interior of said power operated means during alternate submersion and exposure relative to the surface of the sea water.

3. A valve system adapted for intermittent submersion in a corrosive liquid medium and comprising a valve body forming a valve chamber and having flow passages communicating with the valve chamber, a valve member having a port formed therein and being movable between open and closed positions relative to the flow passages, a stem connected to the valve member and having a free end thereof extending outwardly of the valve body, said stem being movable axially to impart movement to the valve member, power operated means surrounding a portion of the stem and being operative to impart axial movement to the stem and valve member, a pressure balancing and volume controlling housing defining a chamber surrounding the free end of the stem, said chamber being in fluid communication with the power operated means and having at least one opening at the upper extremity thereof for allowing the flow of the corrosive medium alternately into and out of the chamber during operation of the power operated means, means forming a wall separating said opening from said stem and for preventing contact between the corrosive medium and the stem, fluid located within said power operated means and in said chamber, said fluid and chamber establishing a liquid seal within said chamber whereby the hydrostatic pressure of the corrosive medium is transmitted to the interior of the power operated means during periods of submersion, means preventing the egress of said fluid from said chamber during periods of exposure above said liquid medium and for preventing ingress of air into said chamber.

4. A power operator system for a valve adapted for intermittent submersion in a liquid medium, said valve having a valve stem extending outwardly therefrom, said system comprising a yoke tube fixed to the valve and surrounding a portion of the stem, a powered drive unit sealingly connected to said yoke tube surrounding a portion of the stem and adapted to impart axial movement to the stem upon energization thereof, the interior of the drive unit being in fluid communication with the interior of the yoke tube, an enclosure for the outer extremity of the valve stem defining a pressure balancing chamber, said enclosure being sealingly connected to said drive unit, said chamber being in fluid communication with the interior of the drive unit, said yoke tube, drive unit and chamber being filled with a liquid substance of lower specific gravity than the specific gravity of said liquid medium, said liquid substance and said liquid medium forming a fluid seal to prevent said liquid medium from contacting the interior of said drive unit, said chamber having at least one opening in the upper extremity thereof for communicating the interior of the chamber with the medium in which the system is submerged allowing the flow of said liquid medium alternately into or out of said chamber, means defining a wall within the chamber for separating the opening from the stem and for preventing contact between the stem and the liquid medium, and means preventing the loss of said liquid substance during intermittent submersion and exposure of said chamber relative to the surface of the liquid medium.

5. A power operator system for a valve adapted for intermittent submersion in water, said valve having a valve stem extending outwardly therefrom, said system comprising a yoke tube fixed to the valve and surrounding a portion of the stem, a powered drive unit sealingly connected to said yoke tube and surrounding a portion of the stem, said drive unit adapted to impart axial movement to the stem upon energization thereof, the interior of the drive unit communicating with the interior of the yoke tube, an enclosure for the outer extremity of the valve stem defining a pressure balancing chamber, said chamber being in fluid communication with the interior of the drive unit, said yoke tube, and chamber being filled with a preservative oil, said chamber having at least one opening in the upper portion thereof for communicating the interior of the chamber with the medium in which the system is adapted for submersion, means forming a wall separating the opening from the stem and for preventing contact between the water and the stem and means preventing loss of the oil during intermittent submersion of the system in said water.

6. A power operator system for a valve adapted for intermittent submersion in a liquid medium, said valve having a valve stem extending outwardly therefrom, said system comprising a yoke tube fixed to the valve and surrounding a portion of the stem, a powered drive unit sealingly connected to said yoke tube and having its interior disposed in fluid communication with the interior of said yoke tube, said powered drive unit surrounding a portion of the stem and adapted to impart axial movement of the stem upon energization thereof, a housing having a closed top wall and a closed bottom wall positioned about the outer extremity of the stem, a first tube fixed to the bottom wall of the housing and extending into the housing to a position adjacent the top wall of the housing, at least a single opening formed in said top wall, said first tube surrounding said stem, a second tube fixed to said top wall about said opening, a portion of said second tube extending into said chamber to a position adjacent the bottom wall, another portion of the second tube extending above said top wall and having a return bend portion extending downwardly, a displaceable plug member press-fitted into said return bend portion, a liquid of lower specific gravity than the specific gravity of the liquid medium substantially filling the chamber, the drive unit and the yoke tube.

References Cited
UNITED STATES PATENTS 1,777,115    9/1930    Bruback    251—267 X
2,747,774    5/1956    Breitenbach    137—236 X
2,970,646    2/1961    Knapp    166—45

WILLIAM F. O'DEA, *Primary Examiner.*

HAROLD WEAKLEY, *Examiner.*